United States Patent
Mok et al.

(10) Patent No.: US 9,313,563 B1
(45) Date of Patent: Apr. 12, 2016

(54) SYSTEM AND METHOD FOR NETWORK SWITCHING

(71) Applicant: PMC-SIERRA US, INC., Sunnyvale, CA (US)

(72) Inventors: Winston Ki-Cheong Mok, Vancouver (CA); Somu Karuppan Chetty, Vancouver (CA)

(73) Assignee: PMC-SIERRA US, INC., Sunnyvale, CA (US)

( * ) Notice: Subject to any disclaimer, the term of this patent is extended or adjusted under 35 U.S.C. 154(b) by 157 days.

(21) Appl. No.: 13/830,231

(22) Filed: Mar. 14, 2013

Related U.S. Application Data

(60) Provisional application No. 61/696,119, filed on Aug. 31, 2012.

(51) Int. Cl.
*H04Q 11/00* (2006.01)
(52) U.S. Cl.
CPC .................. *H04Q 11/0066* (2013.01)
(58) Field of Classification Search
CPC ... H04L 49/351; H04L 47/10; H04L 29/0653; H04L 29/06
USPC .......................................................... 370/389
See application file for complete search history.

(56) References Cited

U.S. PATENT DOCUMENTS

| | | | |
|---|---|---|---|
| 6,594,047 B1 * | 7/2003 | Ballintine et al. ............. | 398/79 |
| 7,394,758 B2 | 7/2008 | Gonda | |
| 7,583,664 B2 | 9/2009 | Ho et al. | |
| 8,218,434 B1 * | 7/2012 | Brown et al. ................. | 370/227 |
| 2003/0048748 A1 * | 3/2003 | Semaan et al. ............... | 370/225 |
| 2006/0067314 A1 * | 3/2006 | Ho et al. ....................... | 370/389 |
| 2007/0076720 A1 * | 4/2007 | Wu ................................ | 370/392 |
| 2011/0026525 A1 * | 2/2011 | He ................................ | 370/392 |
| 2011/0255552 A1 * | 10/2011 | Ellegard ....................... | 370/419 |
| 2013/0114953 A1 * | 5/2013 | Moynihan et al. ............ | 398/5 |

OTHER PUBLICATIONS

International Telecommunication Union, "Transport of IEEE 10GBASE-R in optical transport networks (OTN)", ITU-T Recommendation G Sup43, Feb. 2011, 27 pages.

International Telecommunication Union, "Interfaces for the Optical Transport Network (OTN)", ITU-T, Recommendation G.709, Feb. 2012, 232 pages.

International Telecommunication Union, "Hitless Adjustment of ODUflex (GFP) (HAO)", ITU-T G.7044/Y1347, Oct. 2011, 32 pages.

International Telecommunication Union, "Characteristics of optical transport network hierarchy equipment functional blocks", ITU-T, Recommendation G.798, Dec. 2012, 397 pages.

* cited by examiner

*Primary Examiner* — Charles C Jiang
*Assistant Examiner* — Thad Defauw
(74) *Attorney, Agent, or Firm* — Letters Patent, LLC; Dennis R. Haszko

(57) ABSTRACT

Provided is a method and system for switching between signals in an optical transport network. The method includes extracting identification data from an OTN signal at a termination sink and inserting the identification data into an Ethernet packet. The system includes a termination sink configured to extract identification data from an OTN signal and insert the identification data into an Ethernet packet.

16 Claims, 15 Drawing Sheets

OTN Overhead Bytes

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | | FAS | | | | | | | | | | | | | |
| 2 | RES (2,1) | RES (2,2) | PM&T CM | TCM ACT | TCM 6 | | MFAS | | SM | | | | RES (1,13) | RES (1,14) | JC4 | |
| 3 | TCM 3 | | | | TCM 2 | | TCM 1 | | TCM 5 | | | GCC 0 | | FTFL | JC5 | SM |
| 4 | GCC 1 | | GCC 2 | | APS/PCC/ (4,5) | APS/PCC/ (4,6) | APS/PCC/ (4,7) | APS/PCC/ (4,8) | RES (4,9) | RES (4,10) | RES (4,11) | RES (4,12) | RES (4,13) | RES (4,14) | JC6 | |
| | | | | | | | | | | | PM | | EXP (3,13) | EXP (3,14) | | |
| | | | | | | | | | | | | TCM 4 | | | PSI | OMFI |

| TTI | BIP-8 | BEI/BDI/STAT/RES |
|---|---|---|

| Preamble | DA | SA | Len/Type | Data | FCS |
|---|---|---|---|---|---|

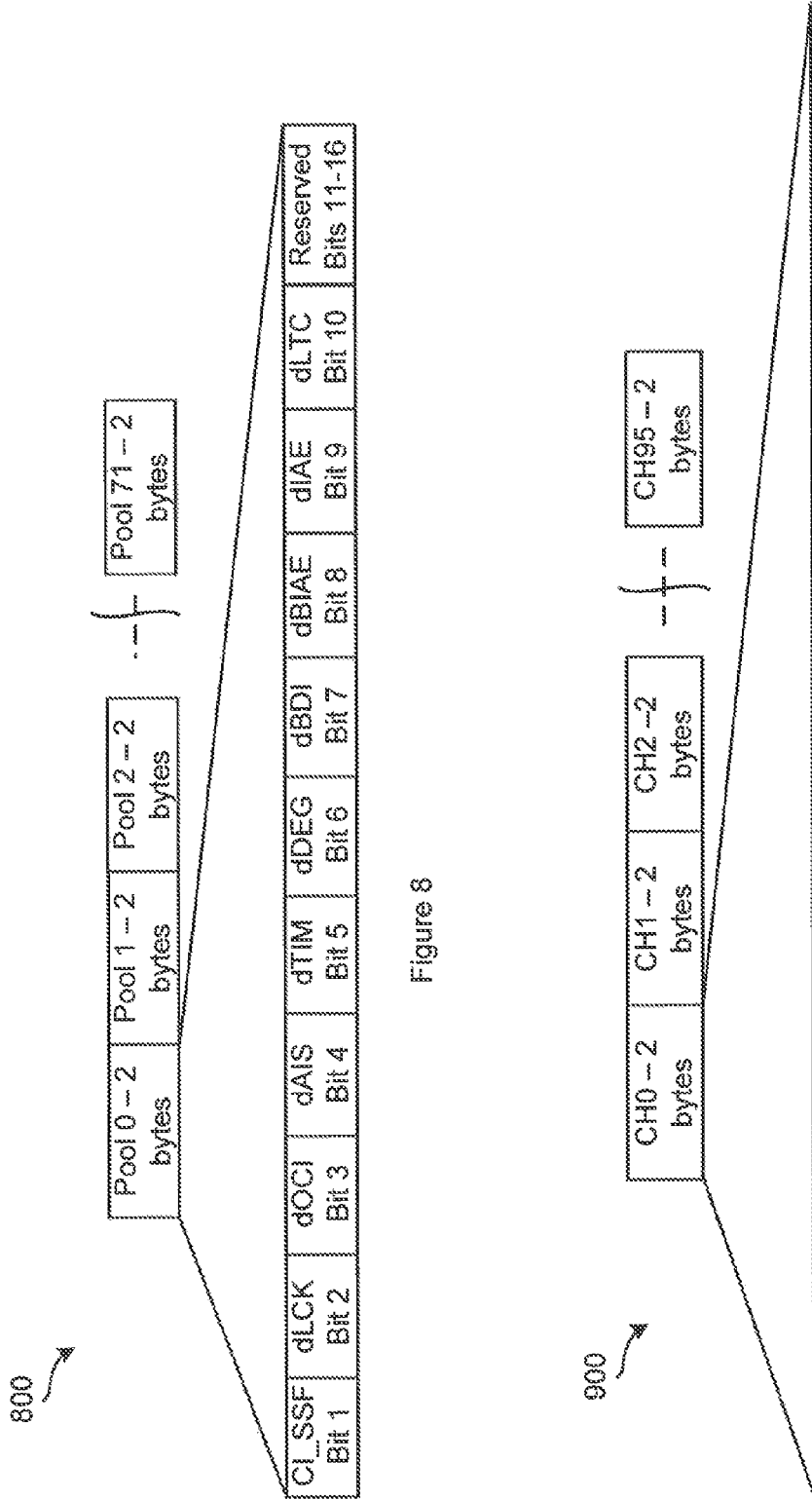

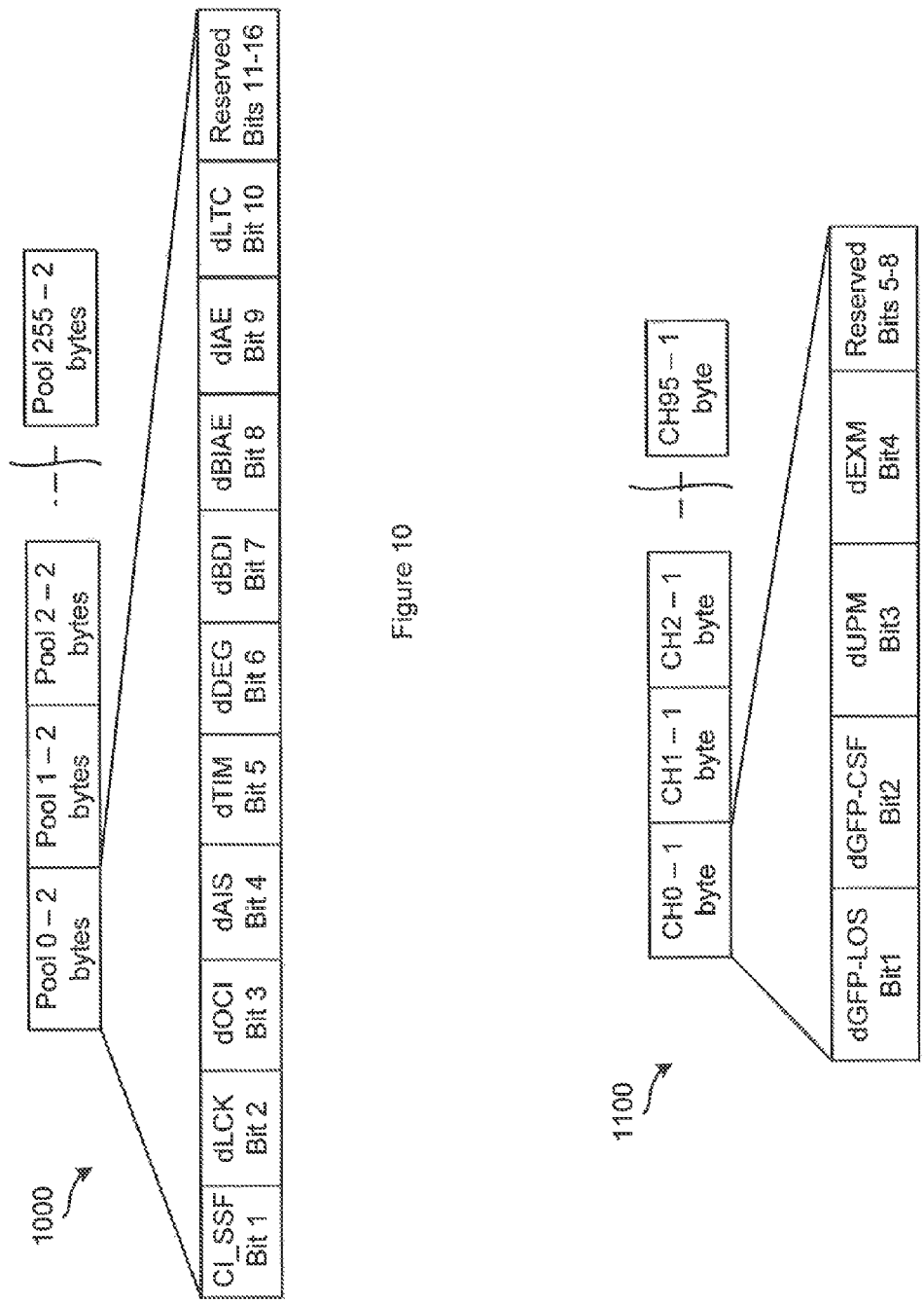

SYSTEM AND METHOD FOR NETWORK SWITCHING

CROSS REFERENCE TO RELATED APPLICATIONS

This application claims the benefit of priority of U.S. Provisional Patent Application No. 61/696,119 filed Aug. 31, 2012 which is incorporated herein by reference in its entirety.

FIELD

The present disclosure relates generally to network switching. More particularly, the present disclosure relates to switching between a working signal and a protect signal over a network.

BACKGROUND

Bandwidth demand on telecommunications networks is increasing. In response, the International Telecommunication Union (ITU) has standardized optical transport networks (OTN), which is a dense wavelength division multiplexing (DWDM) network. The rates and formats of OTN constructs such as optical channel transport unit (OTUk) and optical channel data unit (ODUk) are defined in ITU Telecommunication Standardization Sector (ITU-T) recommendation G.709.

The ITU-T recommendation G.709 has a defined number of ODUk frames, for example, k=0, 1, 2, 2e, 3 and 4, in order of increasing rates. A lower rate ODUj can be multiplexed into a higher rate ODUk. Multi-level multiplexing is permitted under the recommendation. For example, four ODU1 streams may be multiplexed into an ODU2, which may, in turn, be multiplexed along with nine other ODU2 streams, into an ODU4.

In a conventional OTN network element (NE) with a single shelf, there may be 16 to 20 linecards. In a multi-shelf NE, there may be up to 128 linecards. Within each linecard, there may be up to 2 levels of ODTUjk multiplexing, resulting in up to three levels ODUk termination sources and sinks. For an OTU4 linecard, there may be up to 121 ODUk termination sources and sinks. A multi-shelf NE can, therefore, contain up to 128*121=15488 ODUk termination sources and sinks. It may be possible for each linecard to terminate multiple OTU4's or the yet to be defined OTU5.

For backward defect indication (BDI) and backward error indication (BEI) reporting, each ODUk termination source is associated with two ODUk termination sinks. One of the sinks is assumed to be located at the local linecard. The other sink may be located in a remote linecard. It is desirable to provide an efficient method to do the many-to-many connection between the ODUk termination sinks and the corresponding ODUk termination source.

For automatic protection switching (APS) events, due to the tight time budget to respond to events, overheads need to be piped to the APS controller to do the appropriate working and protect switch over and communication links. It is desirable to provide an economical solution for piping the OTN overhead and defects to the APS controller.

BRIEF DESCRIPTION OF THE DRAWINGS

Embodiments of the present disclosure will now be described, by way of example only, with reference to the attached Figures.

FIG. 4A illustrates overhead bytes of an ODUk frame;

FIG. 4B illustrates a generic Ethernet format;

FIGS. 7 to 14 illustrate types of protocol data units;

DETAILED DESCRIPTION

Figure 1:
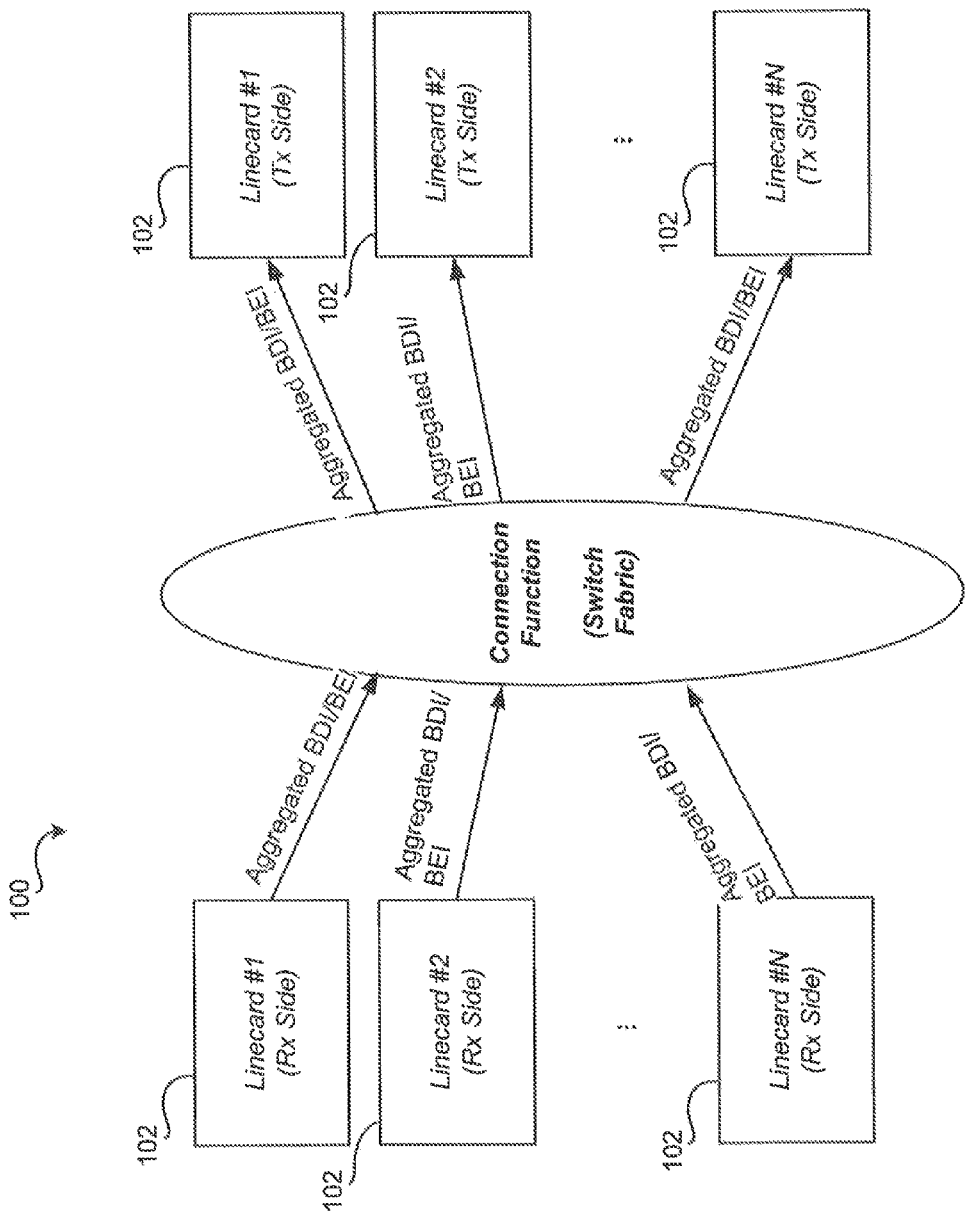
FIG. 1 illustrates an example conventional OTN network element.

Generally, the present disclosure pertains to the field of optical data communications. In particular, it relates to communication of overhead/alarms/counts related to OTN information with a low-cost Ethernet interface. An OTN ring control port reports alarms and defects, for returning backward defect indications and error information, and for extracting and inserting overhead bytes.

Alarms and defects detected by a termination sink process in an OTN network element are reported to its corresponding termination source process and to a centralized processor for generation of performance monitor reports and for making automatic protection switching (APS) decisions. This disclosure provides a mechanism for sending the alarms and defects to their destinations. In addition, overhead bytes extracted from incoming OTU and ODU streams are often processed by a centralized overhead processor, which also inserts overhead bytes into the outgoing OTU and ODU streams. This disclosure also provides the mechanism for transporting the overhead bytes between the overhead processor and the OTU and ODU termination source and sink processes.

In an aspect, the present disclosure provides a method of switching between signals in an optical transport network (OTN). The method includes extracting identification data from an OTN signal at a termination sink and inserting the identification data into an Ethernet packet.

In a further aspect, the identification data comprises a framer identification, a channel identification, and a device identification.

In a further aspect, the identification data is inserted into a source address and destination address field of the Ethernet packet.

In an aspect, the method includes sending the Ethernet packet from the termination sink to an overhead processor, processing the data inserted into the Ethernet packet at the overhead processor, sending the processed data in the Ethernet packet to a termination source, extracting the processed data from the Ethernet packet at the termination source, and inserting the processed data into the OTN signal.

In a further aspect, the overhead processor comprises an automatic protection switching controller.

In an aspect, the method includes sending the Ethernet packet from the termination sink to an Ethernet switch, receiving the Ethernet packet from the Ethernet switch at a termination source, and inserting the identification data into the OTN signal at the termination source.

In a further aspect, the method includes self-learning source and destination addresses at the Ethernet switch and switching between signals in a multi-card network element.

In an aspect, the method further includes extracting protection switching data from the OTN signal at the termination sink and inserting the protection switching data into the Ethernet packet.

In a further aspect, the protection switching data comprises multi-card backward information communication data.

In a further aspect, the method includes extracting defects, alarms, and performance monitoring data from the OTN signal at the termination sink and inserting the defects, alarms, and performance monitoring data into the Ethernet packet.

In an aspect, the present disclosure provides a system for switching between signals in an optical transport network (OTN). The system includes a termination sink configured to extract identification data from an OTN signal and insert the identification data into an Ethernet packet.

In an aspect, the system includes an overhead processor configured to receive the Ethernet packet from the termination sink, process the data inserted into the Ethernet packet, and send the processed data in the Ethernet packet to a termination source and the termination source configured to extract the processed data from the Ethernet packet and insert the processed data into the OTN signal.

In an aspect, the system includes an Ethernet switch configured to receive the Ethernet packet from the termination sink and send the processed data to a termination source and the termination source configured to extract the identification data from the Ethernet packet and insert the identification data into the OTN signal.

In a further aspect, the Ethernet switch is further configured to self-learn source and destination addresses and switch between signals in a multi-card network element.

In an aspect, the termination sink is further configured to extract protection switching data from the OTN signal and insert the protection switching data into the Ethernet packet.

In an aspect, the termination sink is further configured to extract defects, alarms, and performance monitoring data from the OTN signal and insert the defects, alarms, and performance monitoring data into the Ethernet packet.

Other aspects and features of the present disclosure will become apparent to those ordinarily skilled in the art upon review of the following description of specific embodiments in conjunction with the accompanying figures.

FIG. 1 illustrates an example conventional OTN network element (NE) 100. The NE 100 includes a plurality of linecards 102. Each linecard 102 may support multiple OTN fibre connections.

Figure 2:
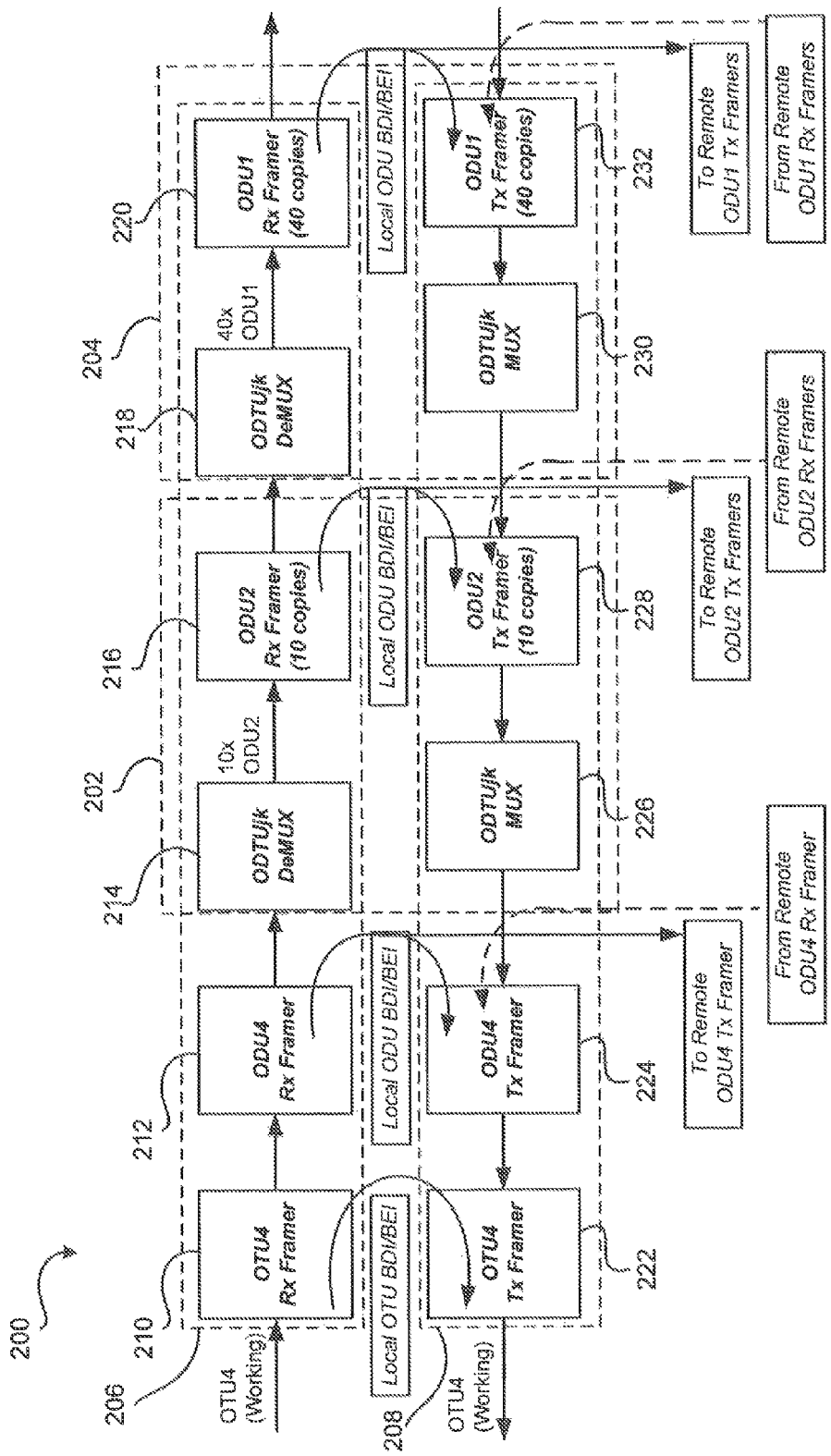
FIG. 2 illustrates a conventional OTN terminating device.

FIG. 2 illustrates a conventional OTN terminating device 200 that supports a first level 202 and a second level 204 of multiplexing. The OTN terminating device 200 includes a receive side 206 and a transmit side 208.

In the receive side 206 of the OTN termination device 200, there is an OTUk termination sink 210, a high-order ODUk termination sink 212, a high-order to middle-order ODTUjk demultiplexer 214, a middle-order ODUk termination sink 216, a middle-order to low-order ODTUjk demultiplexer 218, and a low-order ODUk termination sink 220. The OTUk and ODUk termination sink blocks 210, 212, 216, 220 detect alarms and defects in a received signal. The OTUk and ODUk termination sink blocks 210, 212, 216, 220 extract overhead bytes from the signal.

In the transmit side 208 of the OTN termination device 200, there is an OTUk termination source 222, a high-order ODUk termination source 224, a middle-order to high-order ODTUjk multiplexer 226, a middle-order ODUk termination source 228, a low-order to middle-order ODTUjk multiplexer 230, and a low-order ODUk termination source 232. The OTUk and ODUk termination source blocks 222, 224, 228, 232 report alarms and defects detected by a corresponding source function in backward defect indication (BDI) and backward error indication (BEI) fields of the overhead bytes. The OTUk and ODUk termination source blocks 222, 224, 228, 232 insert other overhead bytes.

OTN signals may have very high bandwidth, ranging from 1.25 Gbps for an ODU0 to 100 Gbps for an ODU4. Therefore, ODUk streams are often protected. Common protection schemes are 1+1 and 1:N, examples of which can be found in ITU-T recommendation G.798.

Figure 3A:
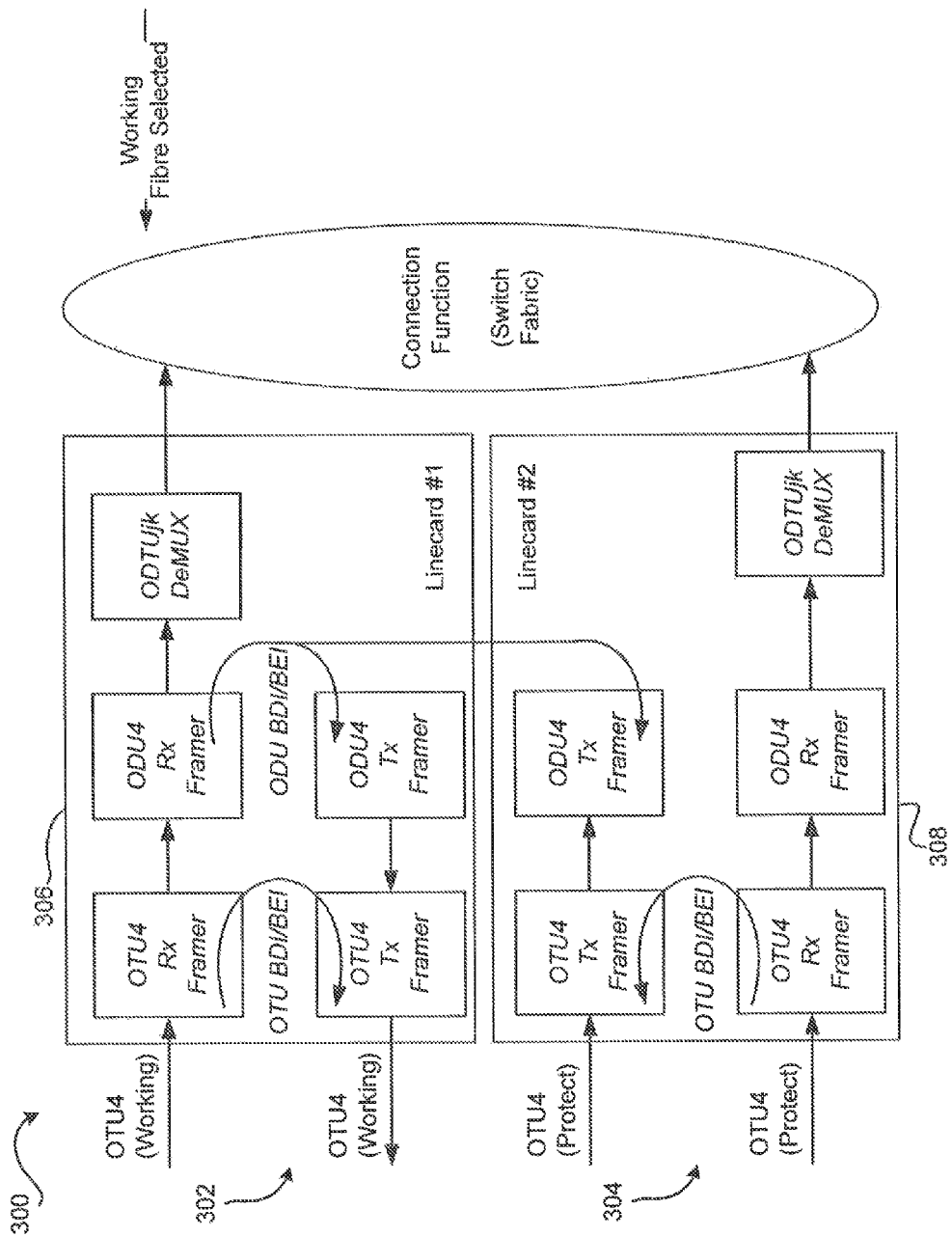
FIGS. 3A and 3B illustrate an example system for 1+1 protection of an ODUk.
Figure 3B:
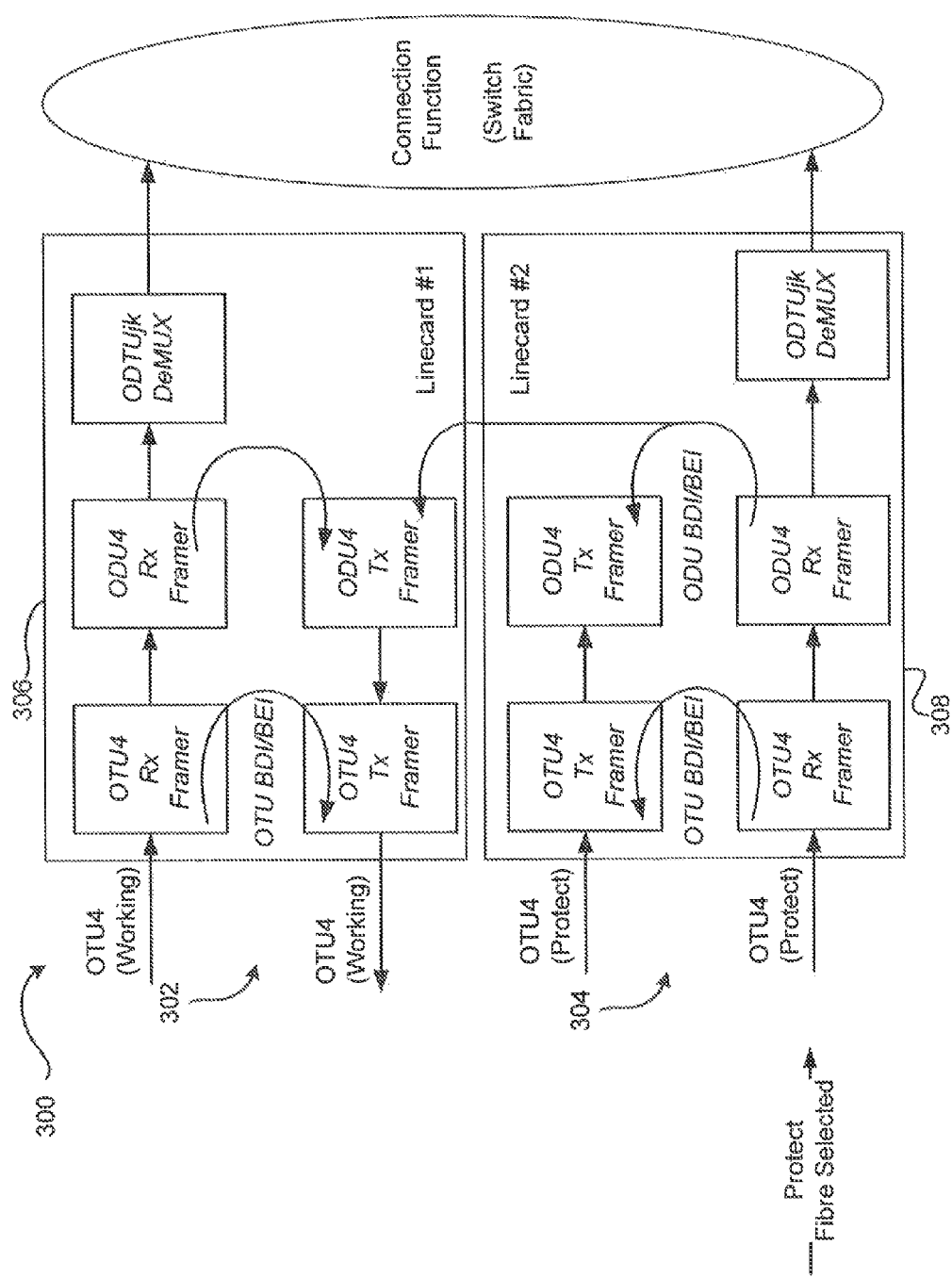

FIGS. 3A and 3B illustrate an example system 300 for 1+1 protection of an ODUk. In the 1+1 protection system 300, an ODUk generated by an ODUk termination source is bridged and travels through diverse paths to the sink node, where a selector is used to pick one of the copies to be processed by an ODUk termination sink. Diverse working 302 and protect 304 paths in the system 300 may provide for facility protection. In practice, it is often desirable to locate the working 302 and protect 304 copies of the ODUk stream onto separate linecards, in order to provide equipment protection. FIG. 3A illustrates where the working path 302 is selected. FIG. 3B illustrates where the protect path 304 is selected.

The 1+1 protection system 300 includes two linecards, a first linecard 306 connected to the working OTUk 302 and a second linecard 308 connected to the protect OTUk 308. Each linecard 306, 308 supports two levels of multiplexing, for example as illustrated in FIG. 2. To extract the middle-order ODUj from the high-order ODUk, the ODUk must be terminated. Similarly, in order to extract the low-order ODUi from the middle order ODUj, the ODUj must be terminated. The low-order ODUi may also be terminated in certain applications. This leads to duplicated ODU termination sinks and sources with only one active copy. The active termination sink reports BDI and BEI results from defects gathered by the active termination source. The active termination sink may be located in the same linecard 306, 308 as the active termination source or in the other linecard 308, 306.

The system 300 also includes a plurality of active termination sink/termination source pairs. For example, the high-order ODU may be an ODU4, the middle-order ODUj may be a set of 10 ODU2's and the low-order ODUi may be a set of 80 ODU0's. In this case, there are a total of 1+10+80=91 active ODU termination pairs. This disclosure describes a method and system to convey the BDI and BEI results from the termination sinks to the corresponding termination sources.

FIG. 4A illustrates overhead bytes 400 of an ODUk frame. For simplicity, justification control (JC) 1, 2, 3 are not shown. A subset of the overhead bytes are extracted by each ODUk termination sink and sent to an overhead processor within each OTN NE. In the other direction, a subset of the overhead bytes is sent from the overhead processor to each termination source for insertion into the ODUk stream. This disclosure describes a method and mechanism to convey the overhead bytes to and from the overhead processor and the ODUk termination source and sink, respectively.

APS decisions are based on alarms and defects detected by ODUk termination sinks. In many implementations, there is an APS controller within the NE. In order to minimize the number of events arriving at the APS controller, each termination sink summarizes the detected alarms and defects detected over a period of time and sends reports to the APS controller periodically. This disclosure describes a method and mechanism to convey the summarized reports to the APS controller in a cost effective manner.

In accordance with an embodiment, each linecard in a system carries one or more of Ethernet interfaces to transfer one interface to transfer and receive BDI, BEI, and backward incoming alignment error (BIAE) information per layer, per channel. The system contains APS information for a single selectable level keyed in a multiframe alignment signal (MFAS). This link is referred to as a remote information ring control port (RI_RCP').

An interface transfers the defects, alarms, and process monitors (PMON) observed by the linecard on various client layers (such as synchronous optical networking (SONET), synchronous digital hierarchy (SDH), generic framing procedure (GFP), and Ethernet) and server layers (such as OTN). This link is referred to as a defect information ring control port (DI_RCP). An interface transfers and receives raw overhead from OTN entities. This link is referred to as the overhead port (OHP). In certain embodiments there are multiple OHP interfaces on a link card depending on the number of OTN framing stages performed.

The RI_RCP interface is a bidirectional interface and may be linked through an Ethernet switch to multiple linecards. The source address and destination address (SA/DA) of the Ethernet interface automatically configures a self-learning switch and routes between the various linecards.

The DI_RCP and OHP interfaces transfers data to the APS processor and overhead processor which can use the encoded SA/DA from the Ethernet interface to identify functions within linecards and between linecards.

A system and method is provided for transferring key OTN related data to enable protection switching capabilities, transmit and receive path data sharing, and simple OTN functions via a low cost Ethernet interface and infrastructure.

FIG. 4B illustrates a generic Ethernet format 401. The generic Ethernet format 400 includes a pre-amble 402 of 8 bytes. The Ethernet format 401 includes source address (SA) 406 and destination address (DA) 404 fields. The SA is 6 bytes and contains information on where the data is coming from. The DA is 6 bytes and contains information on where the data is going to. The Ethernet format 401 includes a type field 408 of 2 bytes. The type field 408 is used as an identifier to classify what type of packet it is. In an embodiment, the type field may be used in the DI_RCP. The Ethernet format 401 includes a payload 410 of variable length depending on usage (e.g. protocol data unit (PDU)). The Ethernet format includes a frame check sequence (FCS) of 4 bytes. An inter-packet gap between packets is 12 bytes.

In an OTN, transferring BDI/BEI/BIAE information per layer from the receive framer to a transmit framer provides fault isolation and performance monitoring of links. APS fields can also be optionally communicated between receive and transmit framer. One layer out of the 8 available is active for protection switching purposes at any one time. Delay measurement (Dm) bits are used to measure the delay across the network.

The transmit/receive OTN entity may be destined for different linecards. In an embodiment, the RI_RCP uses the generic Ethernet format to transfer information. The format of the Ethernet packet uses the generic Ethernet format 401. Specifically, each receive (RX) framer reports BDI/BEI/Dm and APS bytes in its own Ethernet frames. The RX framer identifies itself in the SA field by identification data including a linecard ID, a device ID within the linecard, a framer layer ID within the device, and a channel ID within the framer. In an embodiment, the RCP/OHP 1 byte includes linecard and device identification, 1 byte includes framer identification, 1 byte includes channel identification, and 3 bytes are reserved.

The DA field is software configurable to identify the corresponding transmit (TX) framer. The TX framer is identified by identification data including a linecard ID, a device ID within the linecard, a framer layer ID within the device, and a channel ID within the frame.

In an embodiment, the Ethernet address of each TX framer is set to be the same as that of its local corresponding RX framer. The Ethernet switch self-learns where the TX framers are from by listening to the BDI/BDI/Dm/APS reports generated by the corresponding RX framers. At a protection switching event, the TX framer switches from using status from the local RX framer to the remote RX framer or vice versa (see, for example, switching of FIGS. 3A and 3B).

Figure 5:
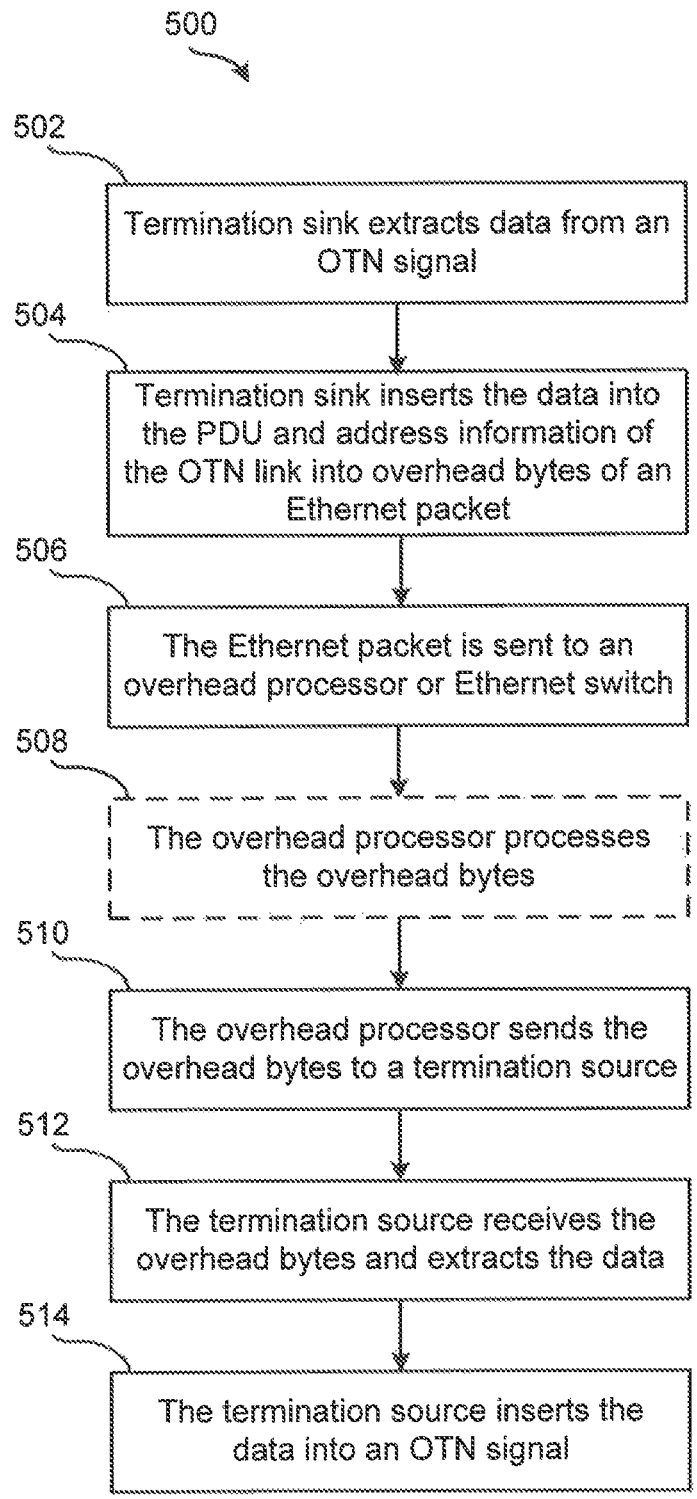
FIG. 5 illustrates a method of switching between signals in an OTN, in accordance with an embodiment.

FIG. 5 illustrates a method 500 of switching between signals in an OTN, in accordance with an embodiment. At 502, a termination sink extracts data from an incoming OTN signal. At 504, the termination sink inserts the data into the PDU and address information of the OTN link into the overhead bytes of an Ethernet packet. The Ethernet packet is sent to an overhead processor or Ethernet switch at 506. Optionally at 508, the overhead processor processes the overhead bytes. At 510 the overhead processor sends the processed overhead bytes to a termination source. At 512, the termination source receives the overhead bytes and extracts the data. The termination source inserts the data into an outgoing OTN signal.

Figure 6:
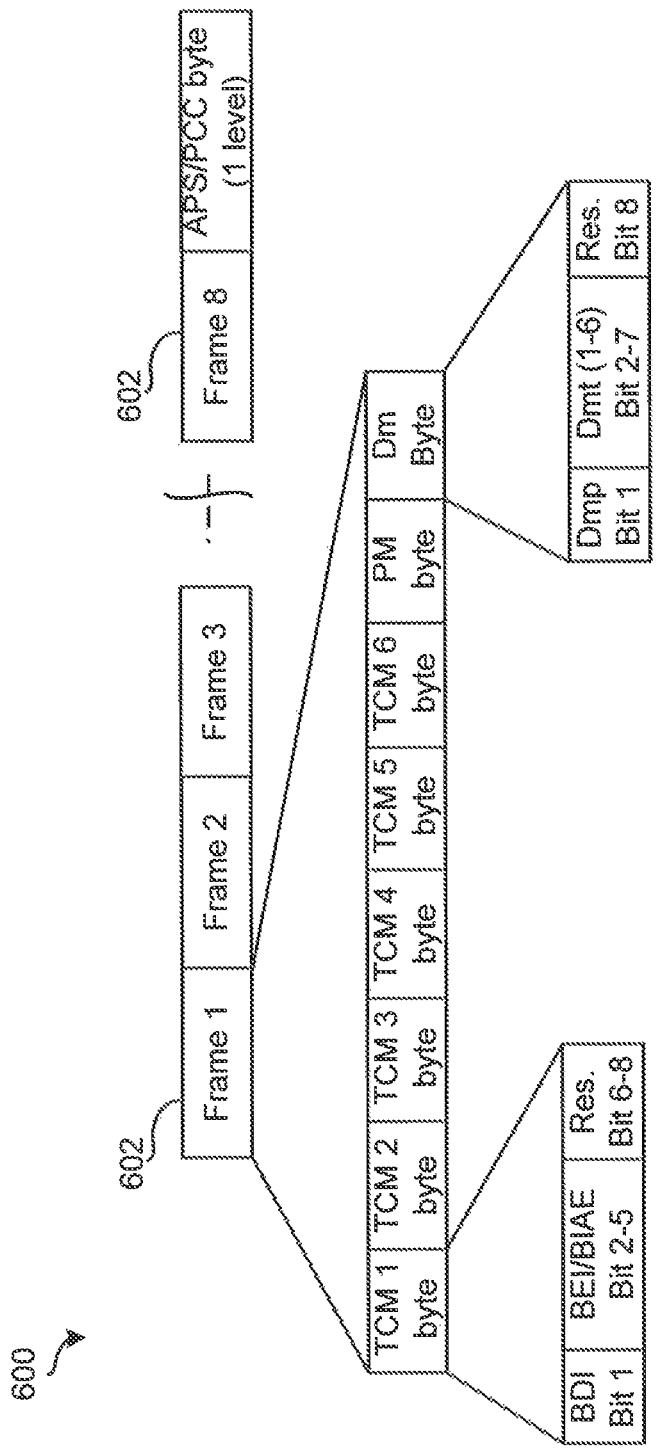
FIG. 6 illustrates a remote information ring control port protocol data unit, in accordance with an embodiment.

FIG. 6 illustrates a RI_RCP PDU 600 showing the payload format of the RI_RCP per OTN, in accordance with an embodiment. An OTN entity is identified by the entire address field, including the linecard ID, the device ID, the framer ID, and the channel ID.

In an embodiment, each RI_RCP PDU carries 8 (OTUk or ODUk) frames 602 worth of status. The number of frames coalesced into each PDU may be decreased to reduce latency at the expense of using higher Ethernet bandwidth. The number of frames per PDU may be increased to reduce Ethernet bandwidth required, at the expense of increased latency. Status information gathered by each RX framer is stored in a buffer and inserted into PDU's.

Management of which OTN RX framer is associated with which OTN TX framer is configured by setting the destination address field of the RI_RCP Ethernet packet. The method may provide improved re-routing and switching in a simple and low-cost system.

For protection switching and link quality check, the APS controller includes alarm, defect, and performance monitoring information with respect to the OTN link or the clients carried within the OTN link (e.g. SONET, Ethernet, and GFP).

The defect information RCP (DI_RCP) link gathers defects and alarms on a configurable interval (as used by the APS controller) from the device and linecard to transmit to the APS controller. During the configurable interval, if a defect and/or alarm occurs the defect or alarm is reported on the DI_RCP, regardless of whether the defect/alarm has cleared by the end of the interval. There are two configurable intervals, one for alarms and defects and another for performance monitor information. In an embodiment, the defect and alarm interval is set at 125 us, while the performance monitoring interval is set at 5 ms. In an embodiment, intervals depend on the desires of the APS controller processing the DI_RCP stream.

The DI_RCP interface uses the generic Ethernet format 500 as described with reference to FIG. 5. The DI_RCP is a transmit only interface from the device to a controller. A single configurable 6-byte destination address identifies the processor. For the SA, the linecard and device fields are programmable with the other fields reserved. The type field indicates the framer layer ID and the type of defects, alarm, and/or performance monitoring information that is carried in the packet.

In an embodiment, the DI_RCP PDU's are split based on layer rather than per channel. For example, OTUk and high-order (HO) ODUk layer belong to one PDU and the next layer (medium-order (MO) ODUj or low-order (LO) ODUj) belong to another PDU type. As different controllers process different layers the Ethernet switch may be used to appropriately route the traffic.

The defects collected may be those described in ITU recommendations G.798, G.709, G.806, and G.7044 or client based standard specifications.

FIGS. 7 to 14 illustrate types of PDU classified with the type field.

Figure 7:
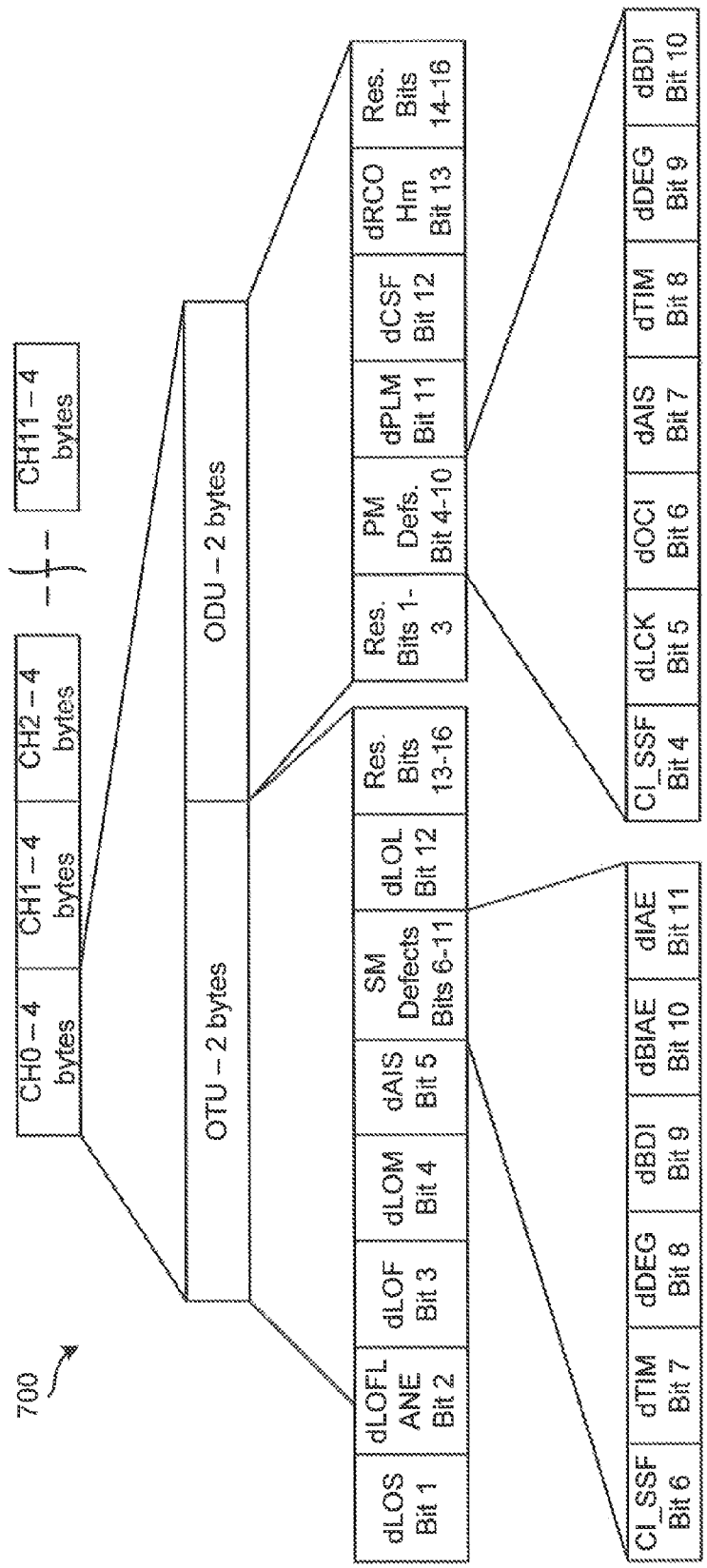

FIG. 7 illustrates an OTUk+HO ODUk defects PDU 700. The OTUk+HO ODUk defects PDU 700 includes 12 channels. The number of channels may vary depending on the configuration of the device.

FIG. 8 illustrates HO ODUk pool based TCM defects PDU 800, in accordance with an embodiment. In a single OTN link there may be up to 6 tandem connection monitoring (TCMs) per channel. In a multi-channel device it may be expensive to contain context for all TCMs for all channels, hence usually there is a "pool" or a subset selection of TCMs for the channels. The pool based HO ODUk defects PDU carry pool of TCM's available for HO ODUk.

FIG. 9 illustrates LO or MO ODUk channel based defects PDU 900, in accordance with an embodiment.

FIG. 10 illustrates LO or MO ODUk pool based TCM defects PDU 1000, in accordance with an embodiment.

FIG. 11 illustrates GFP mapper and demapper channel based defects PDU 1100, in accordance with an embodiment.

Figure 12:
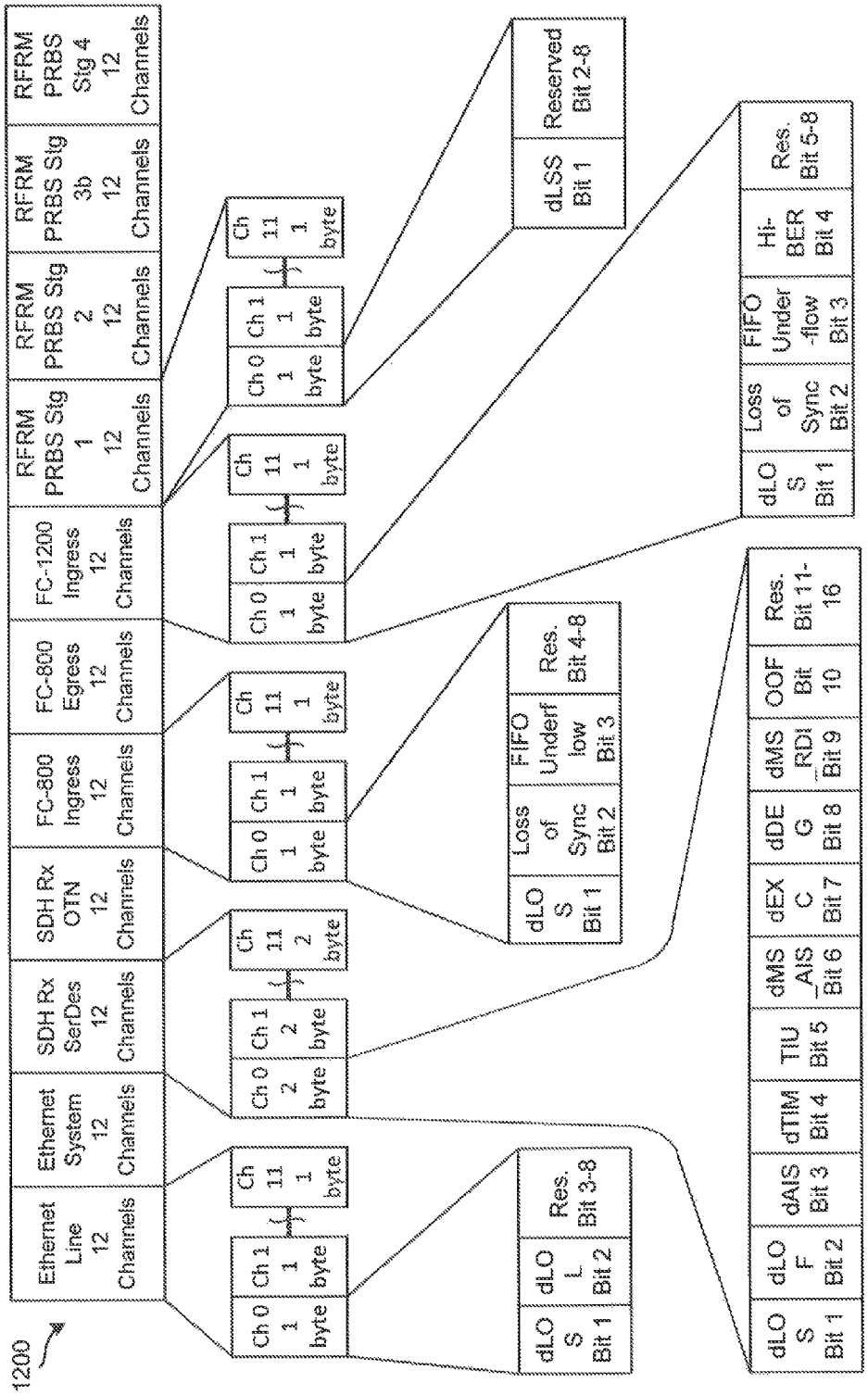

FIG. 12 illustrates client channel based defects PDU 1200, in accordance with an embodiment.

Figure 13:
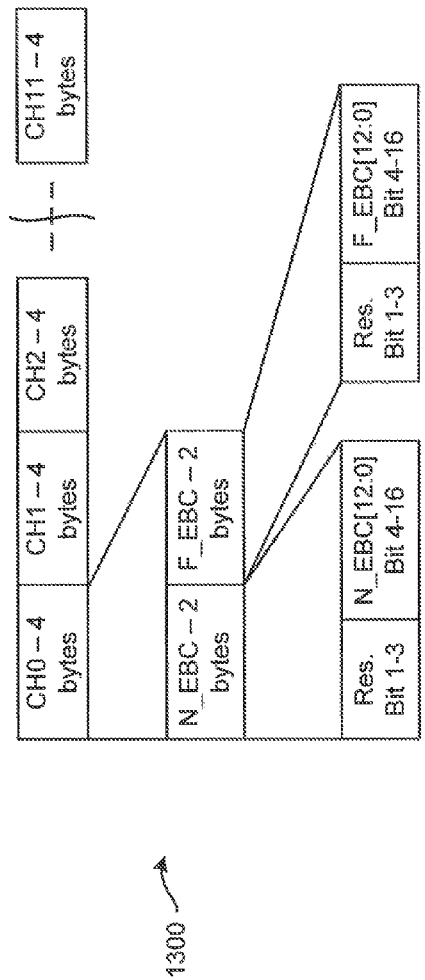

FIG. 13 illustrates ODUk PMON PDU 1300, in accordance with an embodiment. Performance monitoring counts the PDU's. Each one of the PDUs includes near end block counts (NEBC) and far end block counts (FEBC) as per ITU recommendation G.798/G.709 for each OTN link. The PDU's are differentiated in terms of OTUk layer, HO ODUk Layer, and MO/LO ODUk layers.

Figure 14:
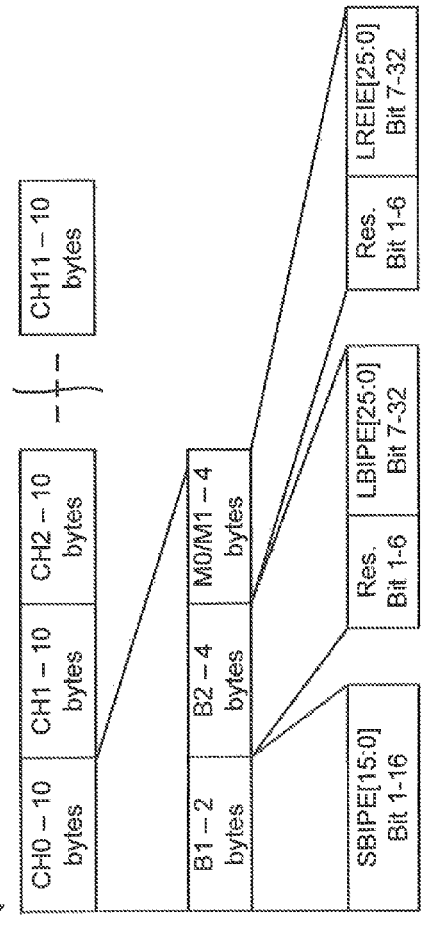

FIG. 14 illustrates a SONET/SDH as the client type for an example of a client PMON PDU 1400, in accordance with an embodiment.

Table 1 details a summary of PDU types in an embodiment of the DI_RCP. Additional PDU types may be added as needed. The example of Table 1 may be used for a device with two stages of ODTUjk multiplexing.

TABLE 1

DI_RCP PDU_TYPE

| PDU type | PDU type | Currently Total Channel/Pool Number |
|---|---|---|
| Channel based OTU + HO ODU line Side defects/alarms | 1 | 12 |
| Channel based OTU + HO ODU System Side defects/alarms | 2 | 12 |
| Channel based HO ODU Line Side Performance Monitor Counts | 3 | 12 |
| Channel based HO ODU System Side Performance Monitor Counts | 4 | 12 |
| TCM pool based HO ODU Line side defects/alarms | 5 | 72 |
| TCM pool based HO ODU System side defects/alarms | 6 | 72 |
| TCM pool based HO ODU Line Side Performance Monitor Counts | 7 | 72 |
| TCM pool based ODU Stage System Side Performance Monitor Counts | 8 | 72 |
| Channel based MO ODU defects | 9 | 96 |
| Channel based LO ODU defects | 10 | 96 |
| Channel based Fabric Ingress ODU defects | 11 | 96 |
| Channel based Mapper Egress ODU defects | 12 | 96 |
| Channel based MO ODU Performance Monitor Counts | 13 | 96 |
| Channel based LO ODU Performance Monitor Counts | 14 | 96 |
| Channel based Fabric Ingress ODU Performance Monitor Counts | 15 | 96 |
| Channel based Mapper Egress ODU Performance Monitor Counts | 16 | 96 |
| TCM pool based MO ODU defects | 17 | 256 |
| TCM pool based LO ODU defects | 18 | 256 |
| TCM pool based Fabric Ingress ODU defects | 19 | 256 |
| TCM pool based Mapper Egress ODU defects | 20 | 256 |
| TCM pool based MO ODU Performance Monitor Counts | 21 | 256 |
| TCM pool based LO ODU Performance Monitor Counts | 22 | 256 |
| TCM pool based Fabric Ingress ODU Performance Monitor Counts | 23 | 256 |
| TCM pool based Mapper Egress ODU Performance Monitor Counts | 24 | 256 |
| GFP-F Mapper/Demapper defects | 25 | 96 |
| Client based defects | 26 | 12 × No. Of clients (11) |
| SONET/SDH Performance monitor counts | 27 | 12 |
| ODU Stage HO/MO/LO PRBS Performance monitor counts | 28 | 3 × 12 |

OTN overhead contains fields as described with reference to FIG. 4. Overheads may contain information with respect to each frame in multi-frame. The MFAS overhead byte cycles from 0 to 255 to identify the 256 frames in a multi-frame. The control plane of a NE communicates via the overheads to other NEs for fault isolation, protection switching, link integrity check, and general communications. The overheads are managed centrally and inserted and extracted at each linecard of the NE.

The OHP interfaces utilize Ethernet packet format to transmit and receive OTN overhead data from and to an external processor. The external processor may be a central processor for all of the linecards.

The OHP data is extracted from the OTN link is prior to any layer processing at the entrance of the receive OTN framer. The insertion position is after all OTN layer processing, at the exit of the transmit OTN framer.

With respect to extraction, all overhead bytes (e.g. 400 of FIG. 4) are selectable for extraction except BIP-8 from path monitoring (PM) and TCMs. The justification control (JC) JC1, JC2, and JC3 OTUk overhead (row 1, bytes 7-14 of an OTN frame) are extracted only on the HO OTUk layer. In an embodiment, the total overhead extraction capacity is 40 bytes per frame. In a further embodiment, the set of overhead bytes to be extracted is software configurable.

With respect to insertion, all overhead bytes including FAS bytes can be inserted except BIP-8 from section monitoring (SM), PM, and TCM number. In an embodiment, the total overhead insertion capacity is 40 bytes per frame. In a further embodiment, the set of overhead bytes to be inserted is software configurable.

An ODU channel can request three types of services from an extraction engine: a data prefetch service request, a data transmission service request, and both the data and prefetch requests.

The data prefetch service request includes the extraction block sending request-only packets for a channel to prefetch 8 frames of insertion overhead data when insertion block has processed 8 frames of data for that channel. For example, the TX framer moves 8 frames ahead from the previous request.

The data transmission service request occurs when the channel has 8 frames of extracted overhead data in its first in first out (FIFO) to send out to the external overhead processor. For example, the RX framer gives 8 frames worth of overhead to the ODU OHP.

The both data and prefetch requests occur when a channel has both prefetch data as well as it has 8 frames of extracted overhead data to send to external overhead processor.

An extraction scheduler is responsible for arbitrating the requests from multiple channels.

Figure 15:
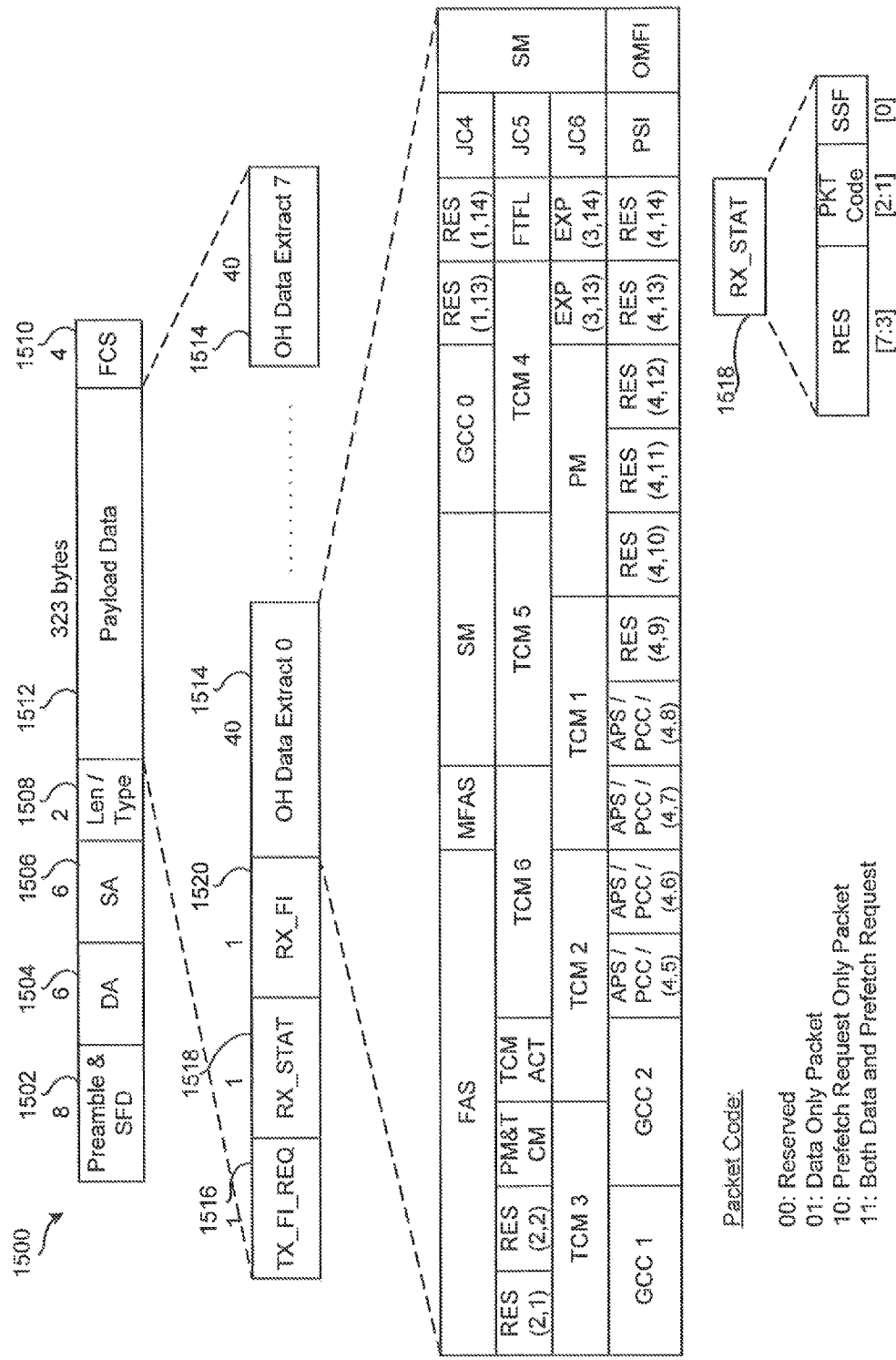
FIG. 15 illustrates an overhead data extraction frame packet, in accordance with an embodiment.

FIG. 15 illustrates an Ethernet packet 1500 for extracted overhead data packet, in accordance with an embodiment. The fields of the extracted overhead data PDU include a preamble and start of frame delimiter (SFD) 1502 of 7+1 bytes. The preamble bit pattern is 7 bytes and the SFD is one byte.

The packet 1500 includes a destination address (DA) 1504 of 6 Bytes including a 48-bit identifier of programmable, user specified 32-bit (DA_UID), an 8-bit framer ID (OHP input port), and an 8-bit channel ID of a channel requesting TX service.

The packet 1500 includes a source address (SA) 1506 of 6 bytes including a 48-bit identifier of programmable, user specified 32-bit (SA_UID), an 8-bit framer ID (OHP input port), and an 8-bit channel ID of channel requesting TX service. The SA with [47:16] is the user-specific ID, the SA with [15:8] is the framer stage number, and the SA with [7:0] is the channel ID. Bit 47 is the most significant bit (MSB) in the SA field. The channel ID ranges from 0-95 and the framer ID ranges from 0-5.

The packet 1500 includes a length/type 1508 of 2 bytes. The length/type 1508 gives the length of the payload in the Ethernet medium access control (MAC) frame. For request only packets, the length/type 1508 is a fixed decimal number 46. For data packets and combined request and data packets, the length/type 1508 is fixed decimal number 323.

The packet 1500 includes a FCS 1510 of 4 bytes including a cyclic redundancy check (CRC) frame check sequence for error detection.

The packet 1500 includes payload data 1512 fixed at 323 bytes. The payload data 1512 carries the extracted overhead data for any channel for 8 frames 1514 (OH_DATA_EXTRACT_0 to OH_DATA_EXTRACT_7). Each frame 1514 consists of 10 overhead words. The maximum fixed size of the overhead data is 80 words (320 bytes) for 8 frames.

The payload data 1512 includes three control bytes (TX_FI_REQ 1516, RX_STAT 1518, and RX_FI 1520) that are appended to the overhead payload.

TX_FI_REQ 1516 with [7:0] is a TX frame indicator managed by the insertion block. TX_FI_REQ 1516 is calculated by the insertion block for each channel by discarding the three lowest least significant bits (LSBs) of the channel's current TX_MFAS and adding a channel specific insertion offset to it. TX_FI_REQ 1516 is given by, for any channel i, TX_FI={TX_MFAS[7:3], 3'b000}; and TX_FI_REQ= TX_FI+ins_offset[i]. For data only packets, TX_FI_REQ 1516 indicates the current location of the TX framer for that channel to external overhead processor. For request only packets and data and request packets, TX_FI_REQ 1516 indicates the starting location of 8 frames, being requested from the external overhead processor.

RX_FI 1520 with [7:0] is a RX frame indicator. As described before, the extraction block buffers 8 sequential frames for each channel before they are sent out to the external overhead processor. RX_FI 1520 contains the RX_FI value of the first of the eight sequential frames in the packet. All the frames in the packet have RX_FI values, which increment sequentially, starting from this value of RX_FI. RX_FI 1520 is valid only if packet contains extracted overhead data for 8 frames. RX_FI 1520 may start from any number from 0 to 255. Unlike TX_FI_REQ, it does not have to be multiple of 8.

RX_STAT 1818 with [7:0] is a status field. RX_STAT 1818 carries signal server fail (SSF) alarm and status information about the type of packet being sent to external overhead processor. Bit [0] is a signal fail indication (SSF alarm) for given channel (active high). Bit [2:1] is a packet type indicator, where 2'b00 then reserved, where 2'b01 then data only packet, where 2'b10 then prefetch request only packet, and where 2'b11 the both data and prefetch request. Bits [3:7] are reserved bits set to '0'.

SSF indicates that the ODU is currently receiving a signal fail from a higher layer (e.g. the ODU layer is receiving CI_SSF). This means that the overhead associated with this channel is unreliable when SSF is asserted.

Figure 16:
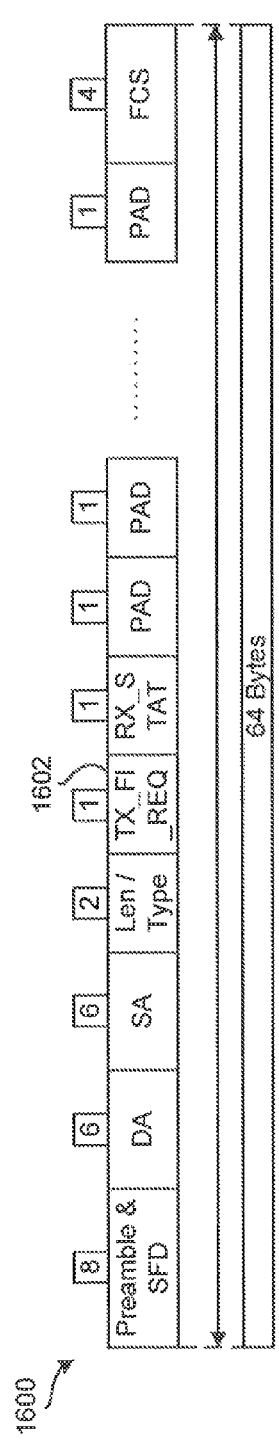
FIG. 16 illustrates a packet of request-only packets, in accordance with an embodiment.

FIG. 16 illustrates a packet 1600 of request-only packets, in accordance with an embodiment. The request-only packet 1600 is generated whenever the insertion block completes processing of eight frames for any given channel and there is no available extraction packet to carry the request for further insertion data. The calculation of TX_FI_REQ 1602 is as explained with reference to TX_FI_REQ 1516.

Figure 17:
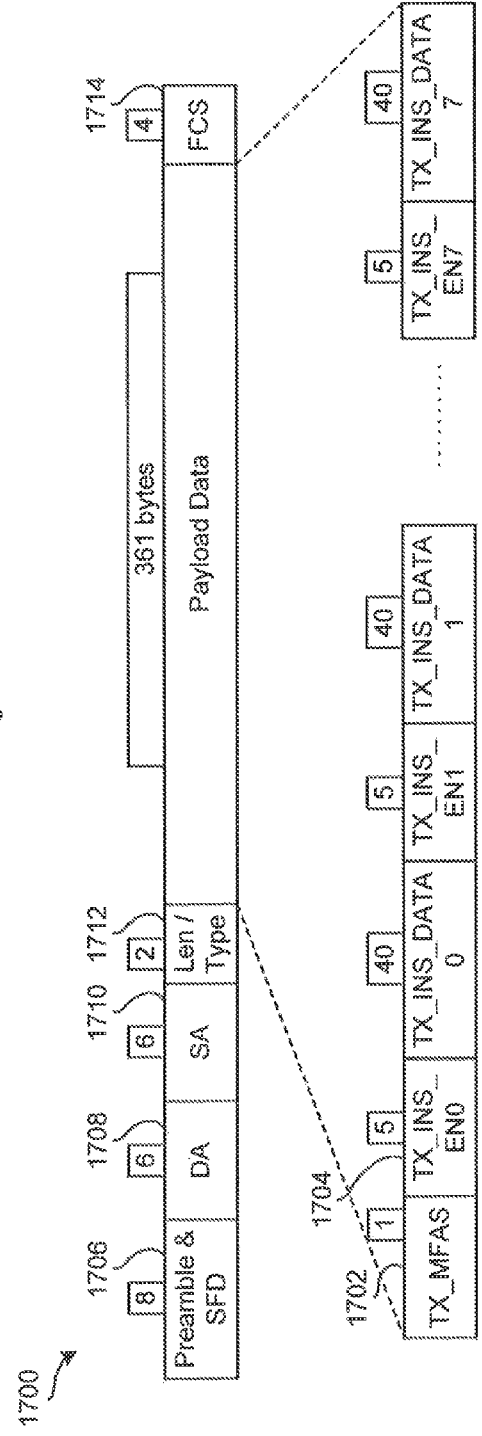
FIG. 17 illustrates an overhead data insertion frame packet, in accordance with an embodiment.

FIG. 17 illustrates an overhead data insertion frame packet 1700, in accordance with an embodiment. When the external overhead processor receives a request for overhead data for any given channel, the overhead processor assembles 8 frames of overhead data for that particular channel and transmits the overhead data (for example, over a 1 Gbps serial gigabit media independent interface (SGMII) link). The packet 1700 of the overhead data packet includes 8 overhead frames, received from the external overhead processor. In an embodiment, the overhead processor can insert up to 40 bytes per frame out of the bytes shown in FIG. 4.

The packet 1700 includes a TX_MFAS 1702 with [7:0]. The TX_MFAS 1702 is the TX_MFAS value of the first frame of insertion overhead data and is the same as the TX_FI_REQ in the request-only or data and request packets.

The packet 1700 includes a TX_INS_EN[N] 1704 with [39:0]. The TX_INS_EN[N] 1704 insertion mask corresponds to the TX_INS_DATA[N]. The data is 40 bytes long and is organized from the global mask selection order.

The packet 1700 includes a preamble and SFD 1706 of 7+1 bytes (7 bytes of preamble bit pattern and one byte for SFD).

The packet 1700 includes a destination address (DA) 1708 of 6 bytes including a 48-bit identifier of programmable, user specified 32-bit (DA_UID), an 8-bit framer ID (OHP input port), and an 8-bit channel ID of the channel requesting TX service. Where DA with [47:16] is a user-specific ID, the DA with [15:8] is a framer stage number, and where DA with [7:0] is a channel ID. Bit 47 is the MSB in the SA field. Channel ID ranges from 0-95 and framer ID ranges from 0-5.

The packet 1700 includes a source address (SA) 1710 of 6 bytes including a 48-bit identifier of programmable, user specified 32-bit (SA_UID), an 8-bit framer ID (OHP input port), and an 8-bit channel ID of the channel requesting TX service. This is not used in the insertion path.

The packet 1700 includes a length and type 1712 of 2 bytes of a fixed length of 361.

The packet 1700 includes a FCS 1714 of 4 bytes including a CRC frame check sequence for error detection.

Figure 18:
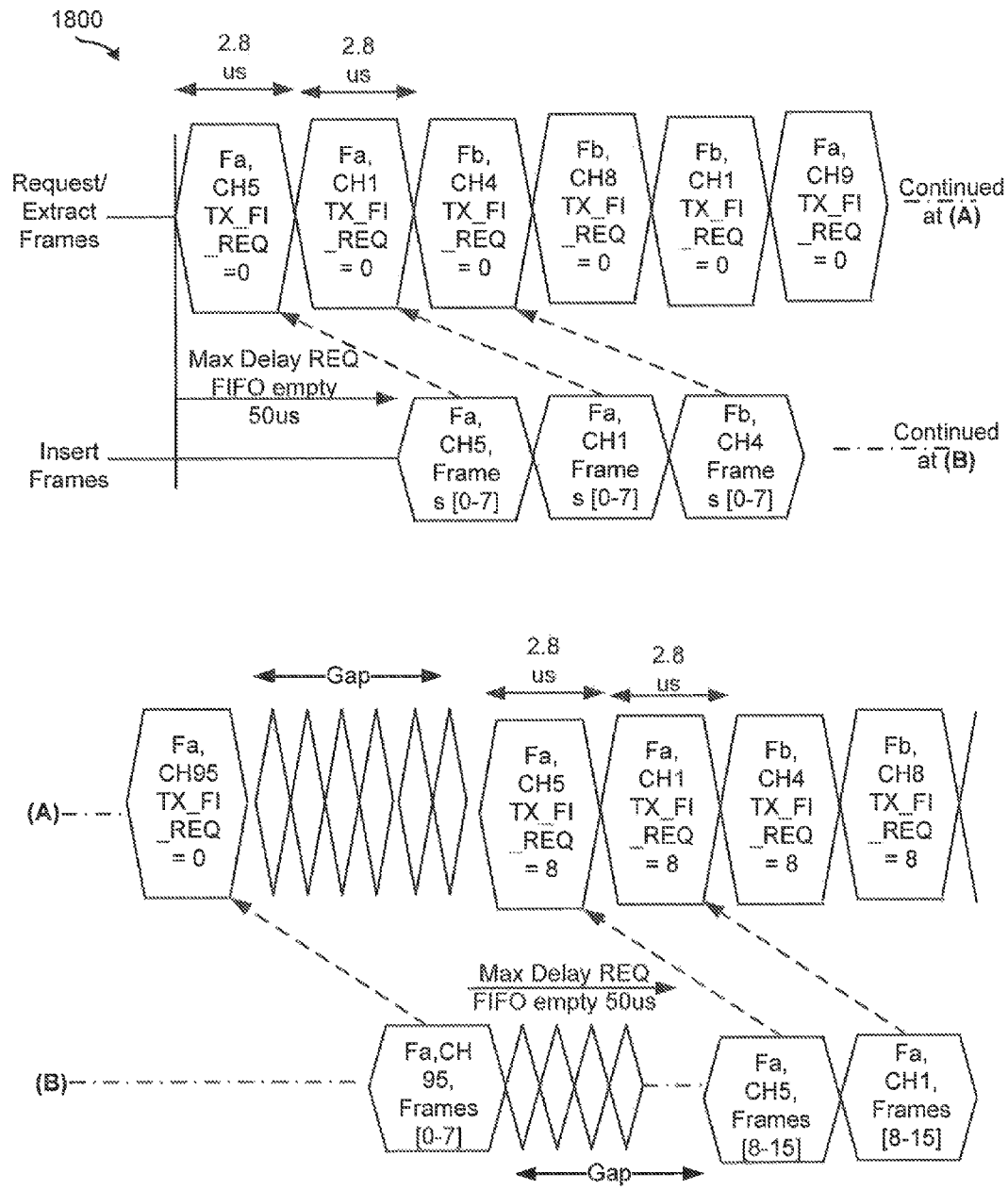
FIG. 18 illustrates results from using an overhead path, in accordance with an embodiment.

FIG. 18 illustrates results 1800 from using an OHP interface as described above. The example results 1800 highlight the response time for 96×2 ODU0, if the same response time is followed for all ODUs in relation to which the interface functions. The extraction packet (req+data, or only data) is 361 bytes which is 2.88 us on the SGMII interface for transfer including 12 IPG bytes. The request only packet is 64 bytes which is 0.608 us on the SGMII interface for transfer including 12 IPG bytes. The insertion packet is 399 bytes which is 3.2 us on the SGMII interface for transfer including 12 IPG bytes.

Since the insertion packet is larger than the extraction packet or request only packet, the external processor would need to store the requests coming from the extraction stream into a FIFO. The minimum depth of the request FIFO is number channels provisioned in that OHP interface (in this case 192).

In an embodiment, the OTN RCP/OHP system is utilized within an OTN subsystem with 6 framer stages having one RI_RCP, one DI_RCP, and three OHP SGMII interfaces. The RI_RCP interface has 6 pairs of TX and RX framers of HO (stage 1), MO (stage 2), LO (stage 3A), fabric (stage 3B), mapper (stage 4), and system OTN (stage N). In an embodiment, there are up to 96 channels for framers 2, 3a, 3b, 4 and an aggregate bandwidth (BW) of 120 G. There are up to 12 channels for framer 1 and N, with an aggregate BW of 120 G.

The RI_RCP runs 8 frames per channel for all 6 framer stages, to achieve a utilization of 70% on a 1 Gbps SGMII link. Similarly, the DI_RCP has defects for all 6 OTN framers along with client and OTUk layer performance monitoring counts and alarms and defects. The DI_RCP runs a 1 Gbps SGMII link with a utilization of 60%. In an embodiment the PDU formats listed in FIGS. 7-14 are supported in the DI_RCP interface.

In an embodiment, the OHP has 3 interfaces, with two per framer stage having a utilization of 65%.

In alternative embodiments, the system and method may be extended to other CBR protocols such as SONET/SDH, which also have working and protection requirements similar to OTN. Where the medium of Ethernet is be used to carry SONET characteristic information (backward information, defects and alarms) in a similar method as the OTN and addressing scheme applied in the RCP/OHP.

In the preceding description, for purposes of explanation, numerous details are set forth in order to provide a thorough understanding of the embodiments. However, it will be apparent to one skilled in the art that these specific details are not required. In other instances, well-known electrical packets and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of monitoring a working OTN signal in an optical transport network (OTN) network element (NE), the method comprising:
   receiving the working OTN signal at a termination sink within the NE;
   obtaining performance monitoring results from the working OTN signal at the termination sink in the NE, the performance monitoring results including at least one of a backward defect indication (BDI), a backward error indication (BEI), a backward incoming alignment error (BIAE), and a summary of detected alarms and defects based on at least one of the BDIs and the BEIs detected at the termination sink over a period of time;
   inserting the performance monitoring results into a payload portion of an Ethernet packet;
   inserting identification data of the termination sink into a source address portion of the Ethernet packet;
   inserting identification data of a termination source corresponding to the termination sink into a destination address portion of the Ethernet packet; and
   sending the Ethernet packet to the termination source in the NE.

2. The method of claim 1 wherein the identification data comprises a framer identification, a channel identification, and a device identification.

3. The method of claim 1 further comprising:
   sending the Ethernet packet from the termination sink to an overhead processor in the NE;
   processing, at the overhead processor, the identification data and performance monitoring results inserted into the Ethernet packet;
   sending the processed data in the Ethernet packet to the termination source;
   extracting the processed data from the Ethernet packet at the termination source; and
   inserting the processed data into at least one of the working OTN signal and a protection OTN signal.

4. The method of claim 3 wherein the overhead processor comprises an automatic protection switching controller.

5. The method of claim 4 further comprising:
   sending the Ethernet packet from the termination sink to an Ethernet switch, the termination sink located on a first linecard of the NE; and receiving the Ethernet packet from the Ethernet switch at the termination source, the termination source located on a second linecard of the NE.

6. The method of claim 5 further comprising:
receiving a protection OTN signal at a second termination sink within the NE, the second termination sink and the termination source located on the second linecard of the NE; and
switching from the working OTN signal to the protection OTN signal.

7. The method of claim 6 further comprising self-learning, at the Ethernet switch, the identification data of the termination source based on identification data of the second termination sink sent in Ethernet packets from the second termination sink to the Ethernet switch.

8. The method of claim 1 further comprising:
sending overhead bytes from the termination sink in the NE to an overhead processor in the NE;
generating, at the overhead processor, an overhead frame, the overhead frame including processed overhead bytes; and
inserting the generated overhead frame into a payload portion of the Ethernet packet.

9. A system for monitoring a working OTN signal in an optical transport network (OTN) network element (NE), the system comprising:
a termination sink within the NE, the termination sink having identification data; and
a termination source within the NE, the termination source having identification data and being in communication with the termination sink;
the termination sink configured to:
receive the working OTN signal;
obtain performance monitoring results from the working OTN signal at the termination sink in the NE, the performance monitoring results including at least one of a backward defect indication (BDI), a backward error indication (BEI), a backward incoming alignment error (BIAE), and a summary of detected alarms and defects based on at least one of the BDIs and the BEIs detected at the termination sink over a period of time;
insert the performance monitoring results into a payload portion of an Ethernet packet;
insert identification data of the termination sink into a source address portion of the Ethernet packet;
insert identification data of the termination source into a destination address portion of the Ethernet packet; and
send the Ethernet packet to the termination source.

10. The system of claim 9 wherein the identification data comprises a framer identification, a channel identification, and a device identification.

11. The system of claim 9 further comprising:
an overhead processor configured to receive the Ethernet packet from the termination sink, process the identification data and performance monitoring results inserted into the Ethernet packet, and send the processed data in the Ethernet packet to the termination source; and
the termination source configured to extract the processed data from the Ethernet packet and insert the processed data into at least one of the working OTN signal and a protection OTN signal.

12. The system of claim 11 wherein the overhead processor comprises an automatic protection switching controller.

13. The system of claim 12 further comprising:
an Ethernet switch configured to receive the Ethernet packet from the termination sink, the termination sink located on a first linecard of the NE, and send the Ethernet packet to the termination source, the termination source located on a second linecard of the NE.

14. The system of claim 13 wherein the Ethernet switch is further configured to:
receive a protection OTN signal at a second termination sink within the NE, the second termination sink and the termination source located on the second linecard of the NE, and
switch from the working OTN signal to the protection OTN signal.

15. The system of claim 14 wherein the Ethernet switch self-learns the identification data of the termination source based on identification data of the second termination sink sent in Ethernet packets from the second termination sink to the Ethernet switch.

16. The system of claim 9 wherein the termination sink is further configured to:
send overhead bytes from the termination sink in the NE to an overhead processor in the NE;
generate, at the overhead processor, an overhead frame, the overhead frame including processed overhead bytes; and
insert the generated overhead frame into a payload portion of the Ethernet packet.

* * * * *